United States Patent
Liñan et al.

(10) Patent No.: US 10,106,072 B2
(45) Date of Patent: Oct. 23, 2018

(54) WORK VEHICLES INCLUDING IMPLEMENT-RESPONSIVE OPTICAL SYSTEMS

(71) Applicant: Deere & Company, Moline (IL)

(72) Inventors: Jose Rene Liñan, Ramos Arizpe (MX); Frederic Paillet, Gray (FR)

(73) Assignee: DEERE & COMPANY, Moline, IL (US)

( * ) Notice: Subject to any disclaimer, the term of this patent is extended or adjusted under 35 U.S.C. 154(b) by 131 days.

(21) Appl. No.: 14/929,001

(22) Filed: Oct. 30, 2015

(65) Prior Publication Data
US 2017/0120800 A1    May 4, 2017

(51) Int. Cl.
*B60Q 1/08*    (2006.01)
*G06K 9/00*    (2006.01)
(Continued)

(52) U.S. Cl.
CPC .............. *B60Q 1/08* (2013.01); *B60Q 1/26* (2013.01); *B60Q 1/2657* (2013.01); *B60Q 2300/45* (2013.01); *E02F 3/40* (2013.01); *F21S 9/04* (2013.01); *F21V 33/00* (2013.01); *G01B 11/00* (2013.01); *G01B 11/25* (2013.01); *G06K 9/00* (2013.01)

(58) Field of Classification Search
CPC ... B60Q 1/02; B60Q 1/24; E02F 9/264; E02F 9/26; E02F 3/40; E02F 3/34; E02F 9/0858; E02F 9/205; E02F 9/2004; E02F 3/964; B60T 7/16; G08C 17/02; B62D 1/04; B66F 9/20; B60L 1/003; B60L 8/003; G06K 9/00; G01B 11/00; G01B 11/25; F21V 33/00
See application file for complete search history.

(56) References Cited

U.S. PATENT DOCUMENTS 8,272,467 B1 * 9/2012 Staab ................ E02F 9/26
                                                    172/2
2004/0050612 A1 * 3/2004 Katae ................. B60L 1/003
                                                    180/315
(Continued)

FOREIGN PATENT DOCUMENTS

DE    3413584 A1    7/1985
FR    2076504 A5    10/1971
(Continued)

OTHER PUBLICATIONS

European Search Report for Patent Application No. 16195107.4 1712 dated Mar. 22, 2017.

*Primary Examiner* — Behrang Badii
(74) *Attorney, Agent, or Firm* — Klintworth & Rozenblat IP LLP; Steven J. Wietrzny (57) ABSTRACT

A work vehicle having an optical system responsive to implement movements is disclosed. The implement-responsive optical system includes an optical device, such as a worklight or camera, which is coupled to the vehicle body and which produces an optical field when active. An adjustment mechanism, such as a closed loop actuation subsystem or a mechanical linkage, is coupled to the vehicle body and to the optical device. The adjustment mechanism is configured to adjust at least one operational characteristic of the optical field in response to movement of the work implement relative to the vehicle body.

7 Claims, 4 Drawing Sheets

(51) Int. Cl.
    *G01B 11/25*      (2006.01)
    *F21S 9/04*       (2006.01)
    *E02F 3/40*       (2006.01)
    *B60Q 1/26*       (2006.01)
    *G01B 11/00*      (2006.01)
    *F21V 33/00*      (2006.01)

(56) References Cited

U.S. PATENT DOCUMENTS

2005/0270778 A1* 12/2005 Hicok .................. B60Q 1/24
                                              362/253
2010/0245542 A1*  9/2010 Kim .................. G01B 11/00
                                              348/46

FOREIGN PATENT DOCUMENTS

| JP | S5976653 U   | 5/1984 |
| JP | H0563980 U   | 8/1993 |
| JP | 2000129722 A | 5/2000 |
| JP | 2004132137   | 4/2004 |

* cited by examiner

WORK VEHICLES INCLUDING IMPLEMENT-RESPONSIVE OPTICAL SYSTEMS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to work vehicles and, more particularly, to an implement-responsive optical system, which adjusts the orientation or other aspects of an optical device in response to movement of a work implement relative to the body of the work vehicle.

BACKGROUND OF THE DISCLOSURE

Work vehicles may be equipped with specialized tools or implements designed to perform tasks useful in various industries, such as the agriculture, construction and forestry industries. A work implement may be mounted to a boom assembly, which may be controlled by an operator to move the implement relative to the body of the work vehicle. Common boom-mounted implements include: buckets, grab forks, blades, bale spears, felling heads and grapples, to list but a few examples. The boom assembly and the boom-mounted implement may be attached to the vehicle body in a manner preventing in-field removal of the boom assembly without disassembly thereof. Alternatively, the boom assembly and boom-mounted implement may be combined as a removable module, which may be temporarily installed on a tractor or other work vehicle on an as-needed basis.

A boom assembly may enable movement of a boom-mounted implement over a relatively broad range of motion relative to the body of a work vehicle. In the case of a boom assembly supporting an loader bucket, for example, the boom assembly may be capable of lifting the bucket to an elevation above the cab of the work vehicle and, therefore, above the eye level of an operator within the work vehicle cab. While this is useful from a functionality perspective, the operator's view of the bucket and its contents may be undesirably restricted when the bucket is lifted to its full height position. Visibility of a bucket or other boom-mounted implement may also be hindered when the work vehicle is operated under low light conditions, and the implement is moved into a position that is poorly illuminated. This may occur when a boom-mounted implement is moved into a position peripheral to the illumination field produced by the vehicle lights (e.g., headlights and worklights), which are may be affixed to the vehicle body or to the boom assembly at various locations. In certain positions, the boom or the boom-mounted implement itself may obstruct the illumination field produced by the vehicle lights, which may inhibit the operator's view of the area ahead or behind the work vehicle.

SUMMARY OF THE DISCLOSURE

A work vehicle including an optical system responsive to implement movements is disclosed.

In one aspect of the disclosure, the work vehicle includes a vehicle body, a work implement mounted to the vehicle body and movable with respect thereto, and an implement-responsive optical system. The implement-responsive optical system includes an optical device, such as a worklight or camera, which is coupled to the vehicle body and which produces an optical field when active. An adjustment mechanism, such as closed loop actuation subsystem or a mechanical linkage, is coupled to the vehicle body and to the optical device. The adjustment mechanism is configured to adjust at least one operational characteristic of the optical field in response to movement of the work implement relative to the vehicle body.

In another aspect of the disclosure, the work vehicle includes a vehicle body, an implement, and an implement-responsive optical system. The implement is movably mounted to the vehicle body by a boom assembly. The implement-responsive optical system includes a worklight, which is mounted to the vehicle body at a location offset from the work implement and which produces an illumination field when energized. An adjustment mechanism, such as closed loop actuation subsystem or a mechanical linkage, is coupled to the light source. During operation of the implement-responsive optical system, the adjustment mechanism automatically adjusting the orientation of the illumination field to track movement of the work implement relative to the vehicle body.

In yet another aspect of the disclosure, an implement-responsive optical system is provided. The implement-responsive optical system for a work vehicle having a vehicle body to which an implement is movably attached. In one embodiment, the implement-responsive optical system includes an optical device and an adjustment mechanism. The optical device is configured to be mounted at a location offset from the implement. The adjustment mechanism is coupled to the optical device and configured to adjust at least one operational characteristic of an optical field generated by the optical device, when active, in response to movement of the work implement relative to the vehicle body.

The details of one or more embodiments are set forth in the accompanying drawings and the description below. Other features and advantages will become apparent from the description, the drawings, and the claims.

DETAILED DESCRIPTION

The following description is provided merely to give examples of the disclosure and is not intended to limit the disclosure or the application and uses of the disclosure. As appearing herein, the term "optical device" refers to a camera, electrical light, or other device that generates and/or detects visible light or other electromagnetic radiation. The term "worklight," as appearing herein, refers to a spotlight or other electrical light that generates a beam of visible light useful for illuminating an area of work. Finally, as further appearing herein, the term "vehicle body" is utilized to refer to a portion of a work vehicle equipped with at least one implement and, specifically, refers to all portions or structures of the work vehicle other than the implement itself.

The following describes embodiments of implement-responsive optical systems utilized onboard work vehicles equipped with movable implements. The implement-responsive optical system includes at least one optical device, such as a camera or worklight, which is may be mounted on or near the work vehicle at a location offset from an implement (e.g., on the vehicle body, a boom, or remote from the vehicle). During operation, the optical system adjusts at least one operational characteristic of the optical device in response to movement of the implement relative to the work vehicle body. The movement of the implement may be from gross movement of the implement by other features (e.g., movement of the implement by one or more booms attached to the vehicle), or from localized movement of the implement (e.g., pivoting of the implement with respect to the booms). For example, in an embodiment wherein the optical system includes a worklight, the worklight may be rotated or otherwise moved such that the illumination field produced by the worklight remains trained on the boom-mounted implement throughout the implement's range of motion (ROM) relative to the body of the work vehicle. Similarly, in another embodiment wherein the optical system includes a camera having a field of view (FOV), the optical system moves the camera such that the camera's FOV remains trained on the implement throughout the implement's ROM. In further embodiments, the optical system may adjust other optical device operational characteristics in response to implement movements, such as the intensity or focus of an illumination field generated by a worklight or the zoom level of a camera. In this manner, embodiments of the implement-responsive optical system may provide an operator of a work vehicle with an enhanced view of the implement throughout its ROM and in low light conditions.

The implement-responsive optical system includes an adjustment mechanism, which performs the desired adjustment to the optical device or optical devices included within the optical system. The adjustment mechanism may be strictly mechanical in nature or, instead, implemented utilizing a logic-based control architecture. Consider, for example, an embodiment of the optical system wherein the adjustment mechanism actively adjusts the orientation of an illumination field produced by a worklight to maintain the illumination field trained on a work implement as the implement is moved relative to the body of a work vehicle. In this case, the adjustment mechanism may include a controller, which commands one or more actuators (e.g., servomotors and the like) to modify the orientation of the illumination field in response to signals received from one or more sensors monitoring implement movement. The adjustment mechanism may change the orientation of the illumination field by moving the worklight itself, by moving the light source (e.g., a bulb) within the worklight, or by moving a beam steering component (e.g., a lens, prism, or mirror) guiding the propagating illumination field. Alternatively, the adjustment mechanism may be realized as a linkage, which is coupled to the boom assembly at one or more locations and which converts movement of the boom assembly into movement of the worklight such that the illumination field tracks the implement as the implement is moved relative to the work vehicle body. Embodiments of the optical system may also usefully provide a similar active pointing functionality when including a camera in addition to or in lieu of a worklight.

It should be noted that the implement-responsive optical system may include one or more head lamps or headlights of the work vehicle, and have one or more adjustment mechanisms mounted within the vehicle body, such as mounted within or near the engine compartment adjacent to the headlights. In addition to providing straight-ahead illumination, the optical system may be configured to control one or more of the headlights to train on the implement as the implement changes position. The system may be configured so that one headlight remains fixed or in a straight-ahead orientation for viewing in the direction of travel, while the other is trained on the moving implement.

Further, the implement-responsive optical system may include multiple optical devices, including one or more optical devices that are physically mounted at a location other than the work vehicle, in which case the optical system would be configured to communicate remotely (e.g., wirelessly) with the optical devices and the adjustment mechanisms. The optical devices may be associated with one or more work vehicles such that each optical device follows a particular work vehicle as well as the motion of the implement as it moves with respect to that work vehicle.

A first example embodiment of an implement-responsive optical system will now be described in conjunction with FIGS. 1A-2. To provide a useful, albeit non-limiting example, the implement-responsive optical system is described below in conjunction with a particular type of work vehicle (a tractor) equipped with a particular type of work implement (a bucket included in an front end loader (FEL) attachment). The following notwithstanding, it is emphasized that embodiments of the implement-responsive optical system may be deployed onboard various other types of work vehicles having one or more movable implements attached thereto. Additionally, embodiments the implement-responsive optical system may adjust one or more operational characteristics of a worklight, camera, or other optical device in response to movement of various different types of work implements without limitation. The implement-responsive optical system may be distributed as an integral part of a work vehicle, as an integral part of a FEL attachment or other module that may be removably attached to and detached from a work vehicle on an as-needed basis, or as a discrete assembly or multi-component kit that may be installed on an existing work vehicle via retrofit attachment.

Figure 1A:
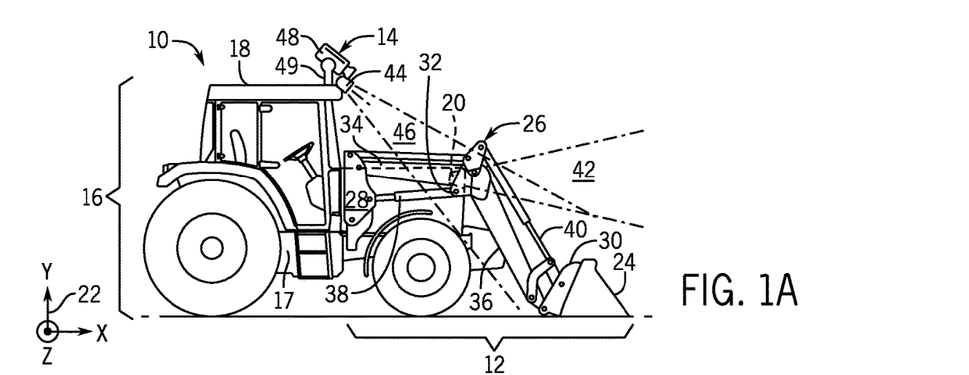
FIGS. 1A-1C are side views of a tractor equipped with an implement-responsive optical system including two optical devices (a camera and worklight), which are moved to track movement of a bucket mounted to the end of a boom assembly, as illustrated in accordance with an example embodiment of the present invention.
Figure 1B:
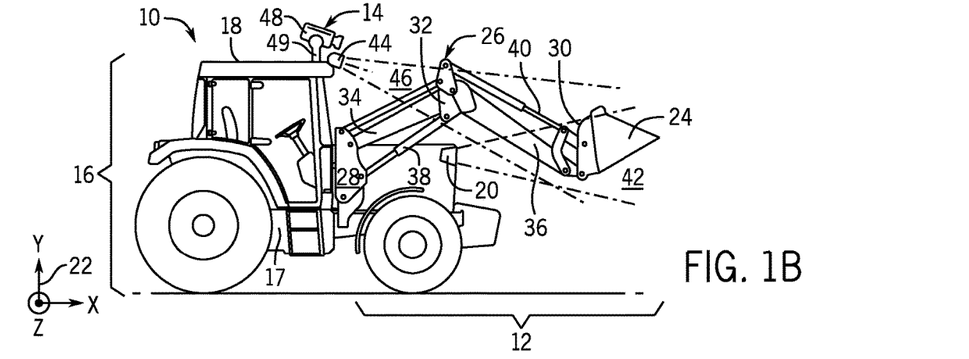
Figure 1C:
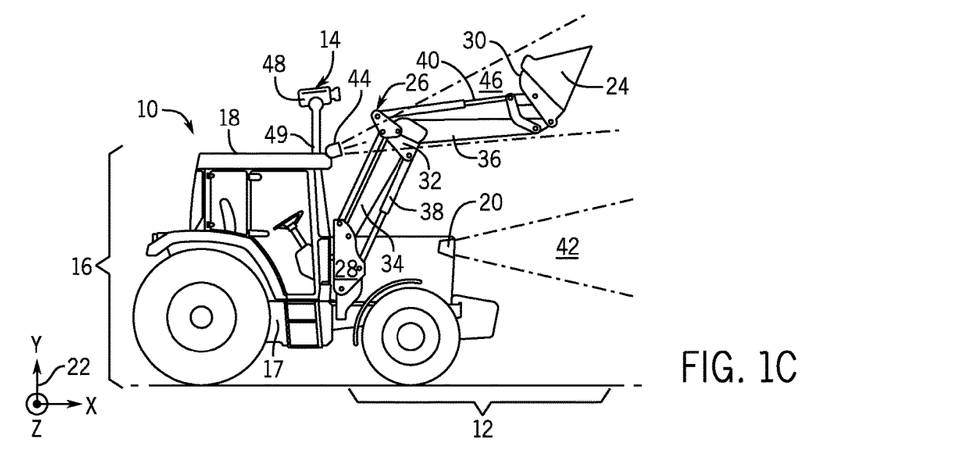

FIGS. 1A-1C are side views of a tractor 10 including a FEL attachment 12 and an implement-responsive optical system 14, as illustrated in accordance with an example embodiment of the present invention. The implement-responsive optical system 14 is only partially shown in FIGS. 1A-1C and will be described more fully below in conjunction with FIG. 2. First, however, a general description of the tractor 10 is provided to establish an example context in which the implement-responsive optical system 14 may be better understood. In addition to the FEL attachment 12 and the optical system 14, the tractor 10 includes a vehicle body 16 having a chassis 17, a cab 18, and headlights 20. The tractor 10 is generally bilaterally symmetrical about its longitudinal axis, which is parallel to the X-axis identified in FIGS. 1A-1C by coordinate legend 22. Thus, while only a single headlight 20 may be seen from the side view illustrated in FIGS. 1A-1C, the tractor 10 may include a second headlight 20 visible from the other, non-illustrated side of the tractor 10.

The FEL attachment 12 includes a work implement 24 and a boom assembly 26, which movably mounts the implement 24 to a forward portion of the vehicle body 16 and, more specifically, to chassis 17. In the illustrated example, the work implement 24 assumes the form of a bucket and will consequently be referred to as hereafter "bucket 24." The bucket 24 may be replaced by a different type of work implement, such as a forklift implement or a bale spear, in alternative embodiments of the tractor 10. The boom assembly 26 may assume any form capable of moving the work implement 24 relative the vehicle body 16 in response to operator commands. In the example embodiment shown in FIGS. 1A-1C, the boom assembly 26 includes a system of linkages, hydraulic cylinders, plumbing lines (not shown), and other components suitable for this purpose. More specifically, the boom assembly 26 includes an aft bracket 28 affixed to the vehicle body 16, a forward bracket 30 to which the bucket 24 is pivotally attached, and an intermediate or mid bracket 32 between the brackets 28 and 30. Twin lift arms 34 (only one of which can be seen in FIGS. 1A-1C) pivotally attach the aft bracket 28 to the mid bracket 32, which is, in turn, attached to the forward bracket 30 by twin bucket arms 36 (again only one of which can be seen). Lift cylinders 38 are further coupled between the aft bracket 28 and the mid bracket 32, while bucket cylinders 40 are coupled between the mid bracket 32 and the forward bracket 30.

The FEL attachment 12 further includes other features, such as hydraulic lines and control valves, which are not shown in FIGS. 1A-1C for simplicity. When the FEL attachment 12 is mounted to the vehicle body 16, the hydraulic lines of the FEL attachment 12 are fluidly connected to a pressurized hydraulic fluid supply on the tractor 10 in a manner permitting an operator seated within the cab 18 to control the cylinders 38 and 40. Beginning from the ground position shown in FIG. 1A, an operator may command the boom assembly 26 to lift the bucket 24 by controlling the lift cylinders 38 to extend. As the lift cylinders 38 extend, the bucket 24 is lifted from the ground position shown in FIG. 1A, travels through the intermediate or mast level position shown in FIG. 1B, and is raised to the full height position shown in FIG. 1C. Similarly, as the bucket cylinders 40 retract in response to operator commands, the boom assembly 26 tilts the bucket 24 from the forward-facing scoop position shown in FIG. 1A, through the intermediate position shown in FIG. 1B, and to the upright position shown in FIG. 1C. Conversely, from the full height position shown in FIG. 1C, the operator may control the boom assembly 26 to stroke cylinders 38 and 40 in a manner opposite to that just described to return the bucket 24 to the grounded, scoop position shown in FIG. 1A.

While work vehicles are commonly equipped with worklights, the worklights are typically affixed to the vehicle body or to the boom assembly in a static manner. As a result, the illumination field generated by the worklights may provide suboptimal lighting of the boom-mounted implement in certain positions. Consider, for example, the headlights 20 of the tractor 10 shown in FIGS. 1A-1C. When activated, the headlights 20 project cones of light (collectively, "an illumination field") ahead of the body 16 of the tractor 10. The illumination field cast by the headlights 20 is represented in FIGS. 1A-1C by the area 42 bounded by a first set of dashed wedge lines. While the headlight illumination field 42 may be relatively broad and far reaching, the orientation of illumination field 42 remains fixed with respect to the body 16 of the tractor 10. The bucket 24 may consequently be located outside of the headlight illumination field 42 when moved into the positions shown in FIGS. 1A and 1C. The operator's view of the bucket 24 and its contents may be thus be hindered by poor illumination in these positions. More thorough lighting may be provided by mounting worklights to the body 16 of the tractor 10 at higher elevations, such as along the upper leading edge of the cab 18. However, as the field of illumination generated by such lights remains static, the bucket 24 may still be movable into positions in which such fixed lights provide suboptimal illumination of the bucket 24, its contents, or the area surrounding the tractor 10.

To overcome the above-noted deficiencies associated with conventional lighting systems, the tractor 10 is equipped with the previously-mentioned implement-responsive optical system 14 (partially shown in FIG. 1). The implement-responsive optical system 14 functions to provide improved visibility of the bucket 24 throughout it ROM in two manners. First, the implement-responsive optical system 14 includes at least one worklight 44, which is rotated or otherwise moved during operation of the optical system 14 to maintain the illumination field produced by the worklight 44 (represented in FIGS. 1A-1C by the area 46 bounded by a second set of dashed wedge lines) trained on the bucket 24 as the bucket 24 is moved relative to the body 16 of the tractor 10. In this manner, the optical system 14 provides substantial uninterrupted, thorough illumination of bucket 24 throughout its ROM relative to the vehicle body 16. Second, the optical system 14 includes a camera 48, which is likewise rotated or otherwise moved to maintain the camera FOV generally centered on the bucket 24 as the bucket 24 is moved relative to the vehicle body 16. As described below in conjunction with FIG. 2, the camera 48 provides a video feed to a monitor located within the cab 18 of the tractor 10 to provide the tractor operator with an enhanced supplemental view of the bucket 24. In further embodiments, the implement-responsive optical system 14 may include only a single type of optical device; for example, the optical system 14 may assume the form of a dynamic or intelligent lighting system in certain embodiments, which includes worklights and associated actuators of the type described below, but which lacks cameras or other optical devices.

In the example embodiment shown in FIG. 1, the bucket 24 moves along a vertical plane containing or parallel to the longitudinal axis of the body 16 of the tractor 10 (corresponding to an X-Y plane in coordinate legend 22). The worklight 44 and the camera 48 thus each need only rotate about a single rotational axis to remain trained on the bucket 24 throughout its ROM relative to the body 16 of the tractor 10. For both the worklight 44 and the camera 48, this rotational axis is parallel to the lateral axis of the tractor 10; a "lateral axis" of the tractor 10 (or other work vehicle) defined as an axis extending within a horizontal plane (an X-Z plane in coordinate legend 22) and perpendicular to the longitudinal axis of the tractor 10. Stated differently, a lateral axis of tractor 10 is parallel to the Z-axis in coordinate legend 22, and worklight 44 and camera 48 are each rotatable about a rotational axis likewise parallel to the Z-axis. In other embodiments wherein the implement-responsive optical system 14 is deployed onboard a work vehicle including a backhoe or other implement that is rotatable about a horizontal axis (corresponding to the Y-axis in coordinate legend 22), the optical device or optical devices included within the optical system 14 may be rotatable about multiple axes including an axis parallel to the horizontal axis.

The optical device or devices included within the implement-responsive optical system 14 may also be imparted with additional degrees of freedom in further embodiments. For example, the worklight 44, the camera 48, or both the worklight 44 and the camera 48 may be moved to translate along any axis in three dimensional space, as appropriate to better illuminate or better visually capture the bucket 24 throughout its ROM relative to the body 16 of the tractor 10. For example, as may be appreciated by comparing FIGS. 1A-1B to FIG. 1C, the camera 48 may be mounted on a telescopic post 49 that extends vertically upward when the bucket 24 is moved into the full height position to provide a better vantage point for observation of the bucket interior and/or to minimize the degree to which the boom assembly 26 visually obstructs the camera's view of the bucket 24. In still further embodiments, the implement-responsive optical system 14 may be configured to move the tractor headlights 20, the light sources (e.g., bulbs) with the tractor headlights 20, or other lights mounted to the tractor 10 to track relative movement of the bucket 24.

Figure 2:
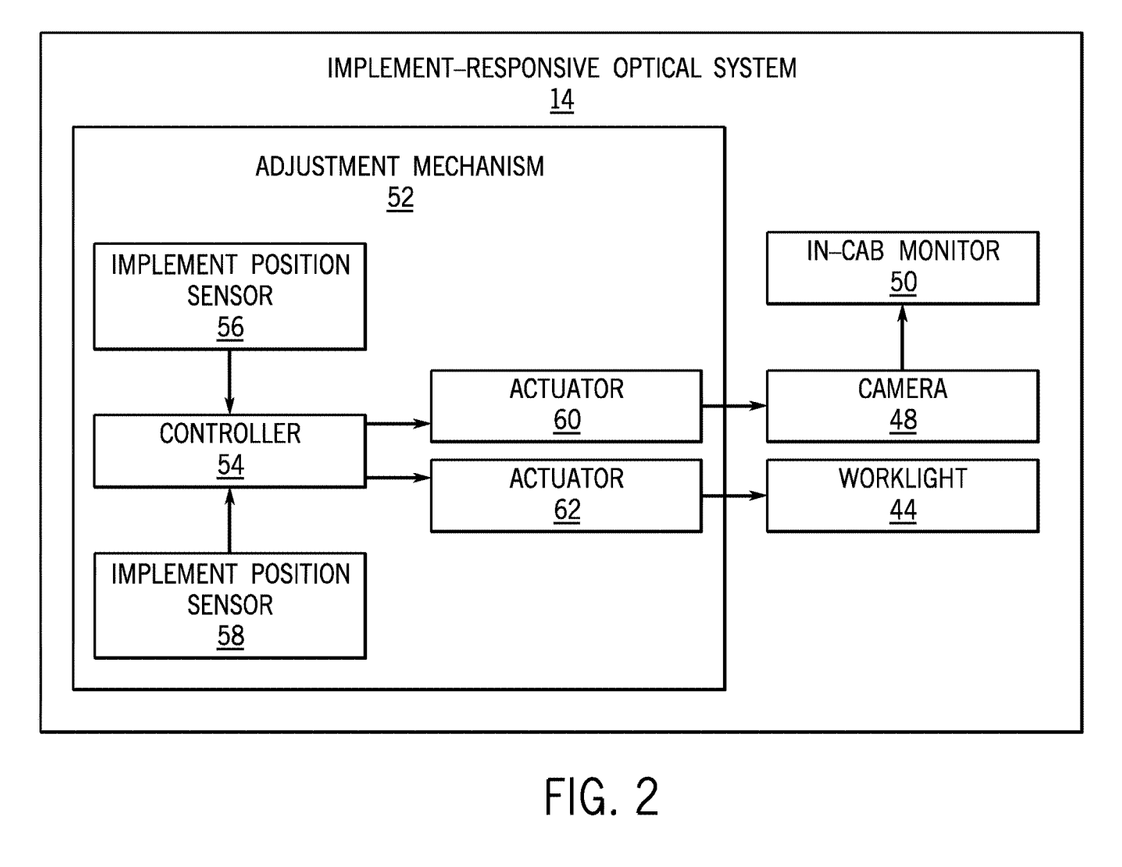
FIG. 2 is a block diagram of the implement-responsive optical system deployed onboard the tractor shown in FIG. 1, as illustrated in accordance with an example embodiment of the present invention.

FIG. 2 is a block diagram schematically illustrating the implement-responsive optical system 14 in greater detail. Here, it can be seen that the implement-responsive optical system 14 includes a monitor 50, which is mounted within the cab 18 of the tractor 10 (FIG. 1) and which displays a video feed from the cab-mounted camera 48. The monitor 50 may be any image-generating device suitable for performing this function. Additionally, the implement-responsive optical system 14 includes an adjustment mechanism 52, which is coupled to the worklight 44 and to the camera 48. In the illustrated example, the adjustment mechanism 52 includes at least one component that is physically attached to the worklight 44. However, in further embodiments, the adjustment mechanism 52 need not be physically attached to the worklight 44 and may instead only be optically coupled thereto by a beam steering component (e.g., a lens, prism, or mirror) manipulable to adjust the orientation or other operational characteristic (e.g., focus) of the illumination field generated by the worklight 44. The adjustment mechanism 52 may assume any form and include any number of components suitable for moving the worklight 44 and the camera 48 in the above-described manner. In certain embodiments, the adjustment mechanism 52 may assume the form of a mechanical linkage, which is joined to the boom assembly 26 at one or more points of attachment and which converts the movement of the assembly 26 into the desired movement (e.g., rotation) of the worklight 44 and the camera 48, as described more fully below in conjunction with FIGS. 3-4. In the example embodiment of FIG. 2, however, the adjustment mechanism 52 assumes the form of a logic-based, closed loop actuation system, as further described below.

In the example embodiment shown in FIG. 2, the adjustment mechanism 52 includes the following components, each of which may be comprised of multiple devices, subsystems, or elements: (i) a controller 54, (ii) a first implement position sensor 56 coupled to a first input of the controller 54, (iii) a second implement position sensor 58 coupled to a second input of the controller 54, (iv) a first actuator 60 coupled to a first output of the controller 54, and (v) a second actuator 62 coupled to a second output of the controller 54. The foregoing components may be interconnected utilizing any suitable work vehicle interconnection architecture, whether wired, wireless, or a combination thereof. In many cases, the foregoing components will communicate over a vehicular bus, which permits bidirectional signal communication with the controller 54. More generally, the individual elements and components of the implement-responsive optical system 14 may be implemented in a distributed manner using any number of physically-distinct and operatively-interconnected pieces of hardware or equipment. As can the implement-responsive optical system 14 generally, the adjustment mechanism 52 may include various other components not shown in FIG. 2, such as dedicated motor controllers when the actuators 60 and 62 are electric motors.

The controller 54 may include or assume the form of any electronic device, subsystem, or combination of devices suitable for performing processing and control functions described herein. In this regard, the controller 54 may be implemented utilizing any suitable number of individual microprocessors, memories, power supplies, storage devices, interface cards, and other standard components known in the art. Additionally, the controller 54 may include or cooperate with any number of software programs or instructions designed to carry-out various methods, process tasks, calculations, and control functions described herein. The controller 54 may further include a memory containing any number of volatile and/or non-volatile memory elements. In many embodiments, the controller memory will include a central processing unit register, a number of temporary storage areas, and a number of permanent storage areas that store the data and programming required for operation of the controller 54.

Referring collectively to FIGS. 1A and 2, the implement position sensors 56 and 58 may each be any device suitable for directly or indirectly monitoring the position of the bucket 24 relative to the body 16 of the tractor 10. For example, in one embodiment, the implement position sensor 56 and 58 may be linear transducers, such as linear variable differential transducers, that monitor the stroke position of cylinders 38 and 40, respectively. The implement position sensors 56 and 58 may provide the stroke position data to controller 54 in an essentially continual manner, at a predetermined refresh rate, or only when a change in stroke position is detected. Controller 54 then derives the current position of the bucket 24 from the stroke position data and commands the actuators 60 and 62 to move their respective optical devices (i.e., the camera 48 and the worklight 44) accordingly. In other embodiments, the implement position sensors 56 and 58 may assume the form of another type of displacement sensors, such as rotary differential transducers, which measure the displacement of other components included in the boom assembly 26 from which the current bucket position may be determined. Such sensors may be included within another system already integrated into the tractor 10, such as a return to position (RTP) system utilized to automatically return the bucket 24 to a pre-stored position in response to operator input. In still further embodiments, the adjustment mechanism 52 may include one or more position sensors, which remotely monitors the position of the bucket 24 utilize distance measuring equipment or another remote monitoring device. For example, in certain embodiments, the camera 48 may be leveraged as the implement position sensor by providing the images captured by the camera 48 to the controller 54 for image processing to determine the current location of the bucket 24 relative to the body 16 of the tractor 10.

The actuators 60 and 62 may be hydraulic, pneumatic, electric, or a combination thereof. In the illustrated example wherein the worklight 44 and the camera 48 rotate in conjunction with movement of the bucket 24 (FIG. 1), rotatory motors, such as stepper motors, as usefully selected for use as the actuators 60 and 62. In such embodiments, the controller 54 may control the actuators 60 and 62 (e.g., stepper- or servomotors) by sending appropriate signals (e.g., pulse width modulation signals) to non-illustrated servomotors associated with the actuators 60 and 62, which then perform the desired adjustments. In this manner, the adjustment mechanism 52 may rotate the worklight 44 and the camera 48 to maintain the worklight illumination field 46 and the camera FOV trained on the bucket 24 throughout its ROM relative to the body 16 of the tractor 10. Visibility of the bucket 24 may thus be enhanced despite broad ranging movement of the bucket 24 and changes in ambient lighting conditions. In further embodiments, the implement-responsive optical system 14 may further alter other operational characteristics of the worklight 44 and/or the camera 48 in response to implement movement. For example, the optical system 14 may increase the brightness or focus of the worklight 44 when the bucket 24 is moved into the full height position shown in FIG. 1C. Also, as previously noted, the implement-responsive optical system 14 need not rotate or otherwise move the worklight 44, in its entirety, during operation. Instead, the optical system 14 and, specifically, the actuator 62 may be configured to rotate only the bulb or other light source contained within the housing of the worklight 44. Alternatively, the optical system 14 may be configured such that the actuator 62 rotates or otherwise manipulates a beam steering component to redirect the worklight illumination field 46 in conjunction with movement of the boom-mounted implement (i.e., bucket 24) rather than the moving the worklight 44 itself.

There has thus been provided an example embodiment of a work vehicle equipped with an implement-responsive optical system, which enhances visibility of a movable implement mounted to the work vehicle. In the above-described example embodiment, the implement-responsive optical system includes two types of optical devices (a worklight and a camera), which each generate an optical field when active. Specifically, the worklight generates a beam of light or illumination field (generically, a first optical field) when energized, while the camera generates (or has associated therewith) a field of view (generically, a second optical field) when operational. The above-described optical system further includes an adjustment mechanism or subsystem, which serves to maintain the camera FOV and the worklight illumination field aimed toward or trained on the work implement as the implement moves relative to the body of the work vehicle. In the above-described example, the adjustment mechanism is produced as an electrical system and, specifically, as a closed-loop actuation system. However, in further embodiments, the adjustment mechanism may be realized exclusively as hardware, such as a linkage attached to a boom assembly to which the implement is mounted. Examples of an optical adjustment system including an adjustment mechanism of this type will now be described in conjunction with FIGS. 3 and 4.

Figure 3:
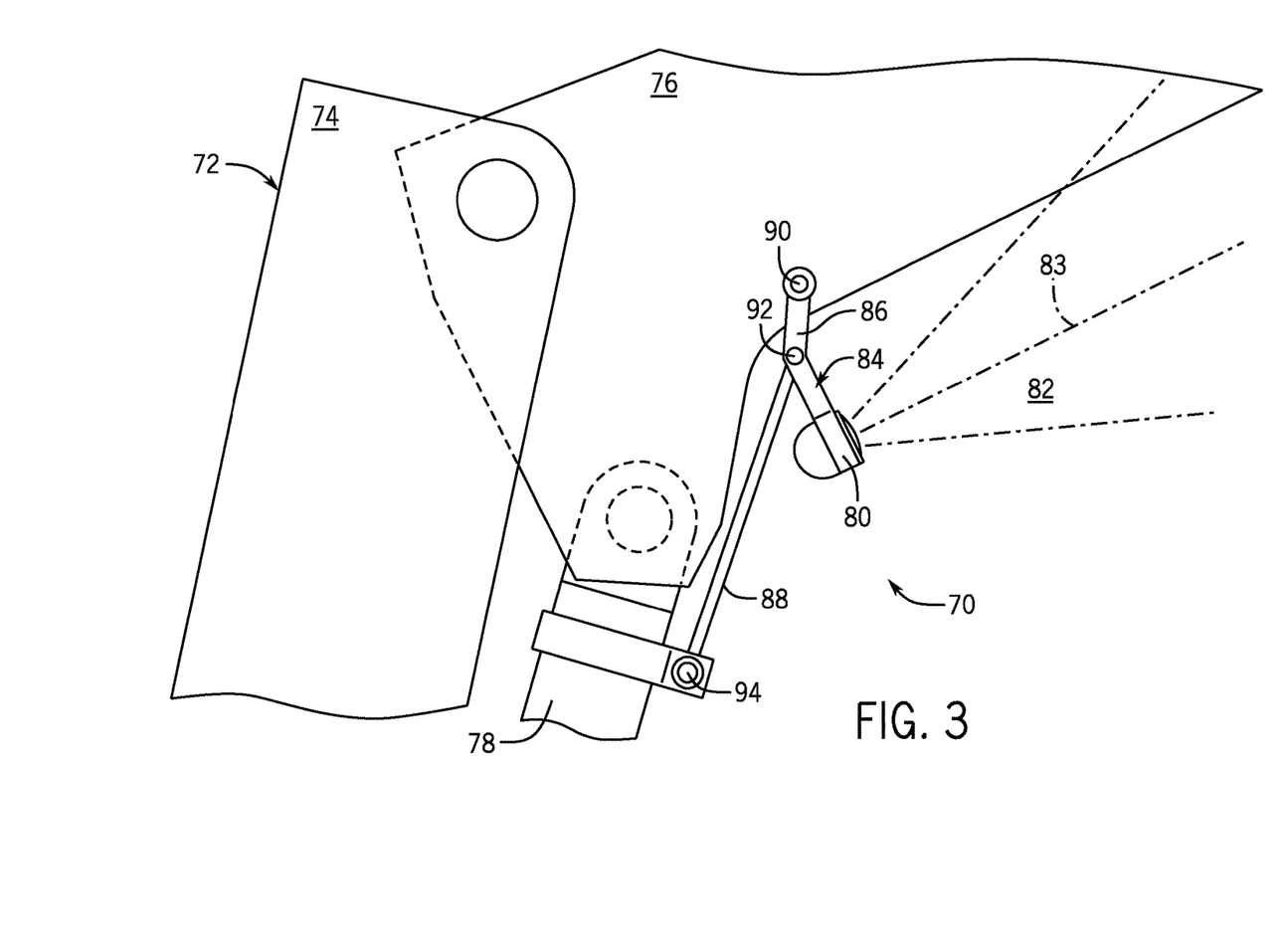
FIGS. 3 and 4 are side views of a work vehicle (partially shown) equipped with an implement-responsive optical system including an optical device mounted to a boom assembly utilizing various linkages, as illustrated in accordance with further example embodiments of the present invention.

FIG. 3 is a simplified side view of an implement-responsive optical system 70 mounted to the boom assembly 72 (partially shown) of a non-illustrated work vehicle. The boom assembly 72 may be similar to the boom assembly 26 of the tractor 10 described above in conjunction with FIGS. 1A-1C. For example, the boom assembly 72 may include an aft bracket 74, a lift arm 76 hingedly joined to the aft bracket 74, and a lift cylinder 78. The implement-responsive optical system 70 includes an optical device in the form of a worklight 80, which generates an illumination field 82 having a centerline 83 when energized. The worklight 80 may be replaced by or utilized in conjunction with (e.g., mounted in a side-by-side relationship with) another type of optical device, such as a camera, in further embodiments of the optical system 70. The implement-responsive optical system 70 further includes an adjustment mechanism in the form of a boom-mounted linkage 84. The boom-mounted linkage 84 includes, in turn, a device-carrying link 86 and a coupler link 88. A first end of the device-carrying link 86 is pivotally coupled to the lift arm 76 at a pivot joint 90, while the second opposing end of link 86 is cantilevered and secures or holds the worklight 80. Similarly, a first end of the coupler link 88 is pivotally coupled to an intermediate portion of the device-carrying link 86 at a pivot joint 92, while the second opposing end of the link 88 is pivotally coupled to the lift cylinder 78 by way of a collar or band clamp 94.

The boom-mounted linkage 84 cooperates with the boom assembly 72 to form a larger four-bar linkage 74, 76, 78. The joints of the four bar linkage 74, 76, 84 include pivot joints 90, 92, 94, as well as the pivot joint coupling the piston of the lift cylinder 78 to the lift arm 76 (identified in FIG. 3 by reference numeral "96"). The angle between the lift arm 76 and the lift cylinder 78 varies as the lift cylinder 78 extends. The coupler link 88 acts on the device-carrying link 86 as this angle changes to rotate the worklight 80 about the pivot joint 90. As the worklight 80 rotates about the pivot joint 90, the orientation of the illumination field 82 generated by the worklight 80 (when active) is adjusted to automatically correct the beam angle. The worklight illumination field 82 is thus dynamically adjusted in conjunction with movement of the boom assembly 72 and its associated implement such that the illumination field 82 remains trained on the implement joined to the non-illustrated terminal end (the far right end in FIG. 3) of the boom assembly 72. In this manner, the worklight 80 can be continually reoriented or actively pointed without the need for a more complex and costly logic-based control system. In one embodiment, the linkage 94 adjusts the worklight 80 such that the centerline 83 of the illumination field 82 transects the implement throughout its ROM with respect to the work vehicle body to which the boom assembly 72 is attached.

Figure 4:
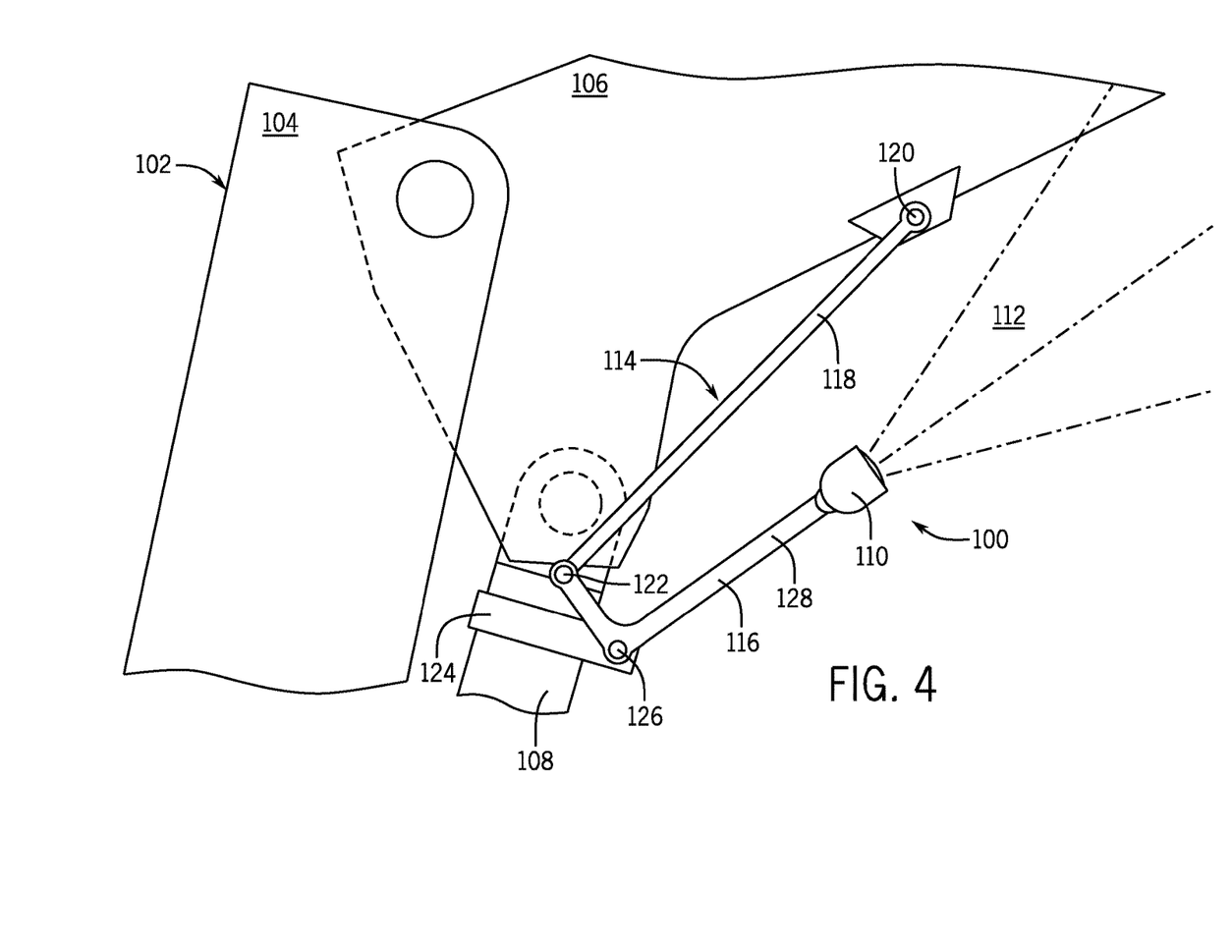

There has thus further been described an embodiment of an implement-responsive optical system including an adjustment mechanism in the form of a relatively simple linkage. The linkage can be implemented in various other manners in further embodiments. Additionally, in certain embodiments, the linkage assembly can also adjust the distance between the worklight and the implement to effectively broaden or tighten the illumination area of the worklight, as considered at the implement. Further emphasizing this point, FIG. 4 is a simplified side view of an implement-responsive optical system 100 mounted to the boom assembly 102 (partially shown) of a work vehicle (not shown). As was previously the case, the illustrated portion of the boom assembly 102 includes an aft bracket 104, a lift arm 106 pivotally joined to the aft bracket 104, and a lift cylinder 108. The implement-responsive optical system 100 once again includes a worklight 110, which produces an illumination field 112 when energized. The optical system 100 further includes a boom-mounted linkage 114 including a device-carrying link 116 and a coupler link 118. A first end of the coupler link 118 is pivotally coupled to the lift arm 106 at a pivot joint 120, while the second opposing end of link 118 is pivotally coupled to an end of the device-carrying link 116 at a pivot joint 122. The device-carrying link 116 is mounted to a collar or band clamp 124 at a pivot joint 126. The band clamp 124 is, in turn, mounted to the lift cylinder 108. Finally, the worklight 110 is secured by the end of device-carrying link 116 opposite the pivot joint 122.

As does the linkage 84 of the optical system 70 (FIG. 3), the linkage 114 of the implement-responsive optical system 100 (FIG. 4) converts changes in the angle between the lift arm 76 and the lift cylinder 78 to rotation movement of the device-carrying link 116. The device-carrying link 116 will thus rotate as the lift cylinder 78 strokes such that the worklight 108 remains generally pointed at or trained on the non-illustrated implement mounted to the terminal end of the boom assembly 102 (the right end of the assembly 102 in FIG. 4). The non-illustrated implement will thus remain illuminated or bathed in the light of the illumination field 110 throughout the implement's ROM. Additionally, in the case of the example optical system 100 shown in FIG. 4, the device-carrying link 116 further includes an elongated lever arm 128 to which the worklight 108 is mounted. The elongated lever arm 128 increases the range over which the worklight 108 moves. As a result, the worklight 108 will be moved away from the non-illustrated implement and the illumination area will be increased or "opened" as the lift cylinder 108 extends and the implement is moved into its full height position.

There has thus been provided multiple embodiments of implement-responsive optical systems utilized onboard work vehicles equipped with movable implements. As described above, the implement-responsive optical system includes at least one optical device, such as a camera or worklight, which is mounted to the body of the work vehicle at a location offset from an implement. During operation, the optical system adjusts at least one operational characteristic of the optical device in response to movement of the implement relative to the work vehicle body. For example, the optical system may include a worklight generating an illumination field that is manipulated to remain trained on a movable implement throughout the implement's ROM relative to the body of the work vehicle. Additionally or alternatively, the optical system may include a camera that is rotated or otherwise moved such that that the camera's FOV remains trained on the implement throughout the implement's ROM. In still further embodiments, the optical system may include other optical devices and/or adjust other optical device operational characteristics in response to implement movements. In so doing, embodiments of the implement-responsive optical system may provide an operator of a work vehicle with an enhanced view of an implement throughout its ROM and in low light conditions.

While at least one example embodiment has been presented, it should be appreciated that a number of variations exist. It should also be appreciated that the example embodiments are only examples, and are not intended to limit the scope, applicability, or configuration of the invention in any way. Rather, the foregoing description will provide those skilled in the art with a convenient road map for work implementing an example embodiment of the invention. It being understood that various changes may be made in the function and arrangement of elements described in an example embodiments without departing from the scope of the invention as set-forth in the appended claims.

What is claimed is:

1. A work vehicle, comprising:
a vehicle body;
a work implement mounted to the vehicle body and movable with respect thereto via a boom assembly, which includes a boom arm and a hydraulic cylinder hingedly coupled to the boom arm; and
an implement-responsive optical system, including:
an optical device coupled to the vehicle body and having an optical field when active; and
an adjustment mechanism coupled to the vehicle body and to the optical device, the adjustment mechanism configured to adjust at least one operational characteristic of the optical field in response to movement of the work implement relative to the vehicle body;
wherein the adjustment mechanism includes a linkage mechanically coupling the optical device to the boom assembly, the linkage includes a light-carrying link pivotally coupled to one of the boom arm and the hydraulic cylinder and to which the optical device is mounted, and a coupler link pivotally coupled between the light-carrying link and the other of the boom arm and the hydraulic cylinder.

2. The work vehicle of claim 1, wherein the adjustment mechanism is configured to adjust the orientation of the optical field in response to movement of the work implement relative to the vehicle body.

3. The work vehicle of claim 2, wherein the adjustment mechanism is configured to adjust the orientation of the optical field such that the optical field remains trained on the work implement as the work implement moves relative to the vehicle body.

4. The work vehicle of claim 1, wherein the vehicle body has a lateral axis, and wherein the optical device is pivotally mounted to the vehicle body and rotatable with respect thereto about a rotational axis substantially parallel to the lateral axis.

5. The work vehicle of claim 1, wherein the optical device is at least one of a camera and a worklight.

6. The work vehicle of claim 1, wherein the optical device includes a camera having a field of view when operational, and wherein the actuator includes a rotary motor configured rotate the camera to maintain the implement within the field of view as the implement moves relative to the vehicle body.

7. The work vehicle of claim 1, wherein the optical device includes a worklight, which generates an illumination field when energized, and wherein the actuator includes a rotary motor configured rotate at least a portion of the worklight to maintain illumination field pointed toward the implement as the implement moves relative to the vehicle body.

* * * * *